J. W. OGDEN.
POSTAGE METER AND MAIL MARKING MACHINE.
APPLICATION FILED NOV. 22, 1920.

1,390,156.

Patented Sept. 6, 1921.
2 SHEETS—SHEET 1.

Witness:
Robert F. Beck

Inventor
Jacob W. Ogden
By Alexander & Dowell
Attorneys

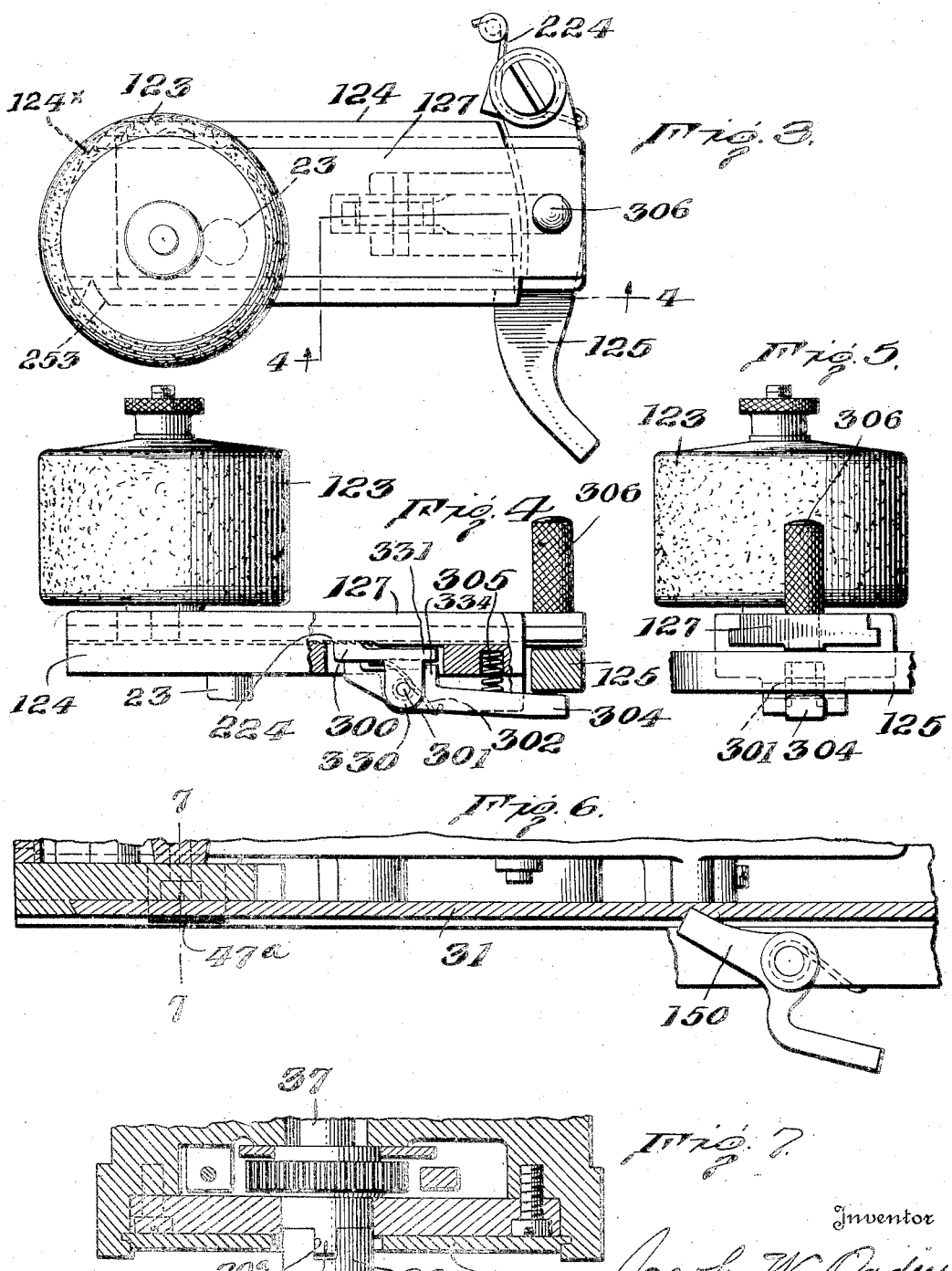

UNITED STATES PATENT OFFICE.

JACOB W. OGDEN, OF STAMFORD, CONNECTICUT, ASSIGNOR TO PITNEY-BOWES EXPORT CORPORATION, OF STAMFORD, CONNECTICUT, A CORPORATION OF DELAWARE.

POSTAGE-METER AND MAIL-MARKING MACHINE.

1,390,156.  Specification of Letters Patent.  Patented Sept. 6, 1921.

Application filed November 22, 1920. Serial No. 425,776.

*To all whom it may concern:*

Be it known that I, JACOB W. OGDEN, a citizen of the United States, residing at Stamford, in the county of Fairfield and State of Connecticut, have invented certain new and useful Improvements in Postage-Meters and Mail-Marking Machines; and I hereby declare that the following is a full, clear, and exact description thereof, reference being had to the accompanying drawings, which form part of this specification.

The present invention relates to inking mechanism for mail marking machines and postage meters of the type shown and described in Arthur H. Pitney's Patent No. 1,273,793, July 23, 1918 and his applications Serial No. 368,701, filed March 25, 1920, (Case 6424) and Serial No. 385,681 filed June 1, 1920, (Case 6438).

The objects of the present invention are:—
(1) to provide means whereby the meter carrying the printer must be accurately positioned in the machine before it would be possible for the printer to be effectively operated; (2) to provide novel means whereby the meter cannot be removed from, or replaced in, the machine unless the inker is in inoperative position, thus insuring placing of the inker in operative position before the machine can be effectively operated; (3) to provide a novel adjustable support for the inker, whereby it may be moved into position to contact with the printer or out of position to contact therewith, and held in adjusted position; (4) to provide novel means for locking the inking roller on its support after it is adjusted so that it can not be backed out of contact with the die when it is in operative position; (5) to provide novel means whereby the inker is locked in inoperative position when the meter is removed from the machine, and will be automatically released when the meter is properly positioned in the machine.

The foregoing objects and other minor ones are attained by this invention, and the accompanying drawings illustrate one practical embodiment thereof; and I will hereinafter describe the same in detail with reference to such drawings; but the invention is not restricted to the specific construction and combinations of parts shown, and includes such variations in form, arrangement and combination of parts as fall within the scope of the appended claims.

Fig. 3 is an enlarged detail plan view of the inker and its support.

Fig. 4 is a top side elevation and part longitudinal section on line 4—4 of Fig. 3.

Fig. 5 is a detail end view of Fig. 4.

Fig. 6 is an enlarged detail longitudinal section through the lower part of the meter case showing the means for locking it in position in the machine.

Fig. 7 is a detail transverse section on line 7—7 Fig. 6.

Figure 1:
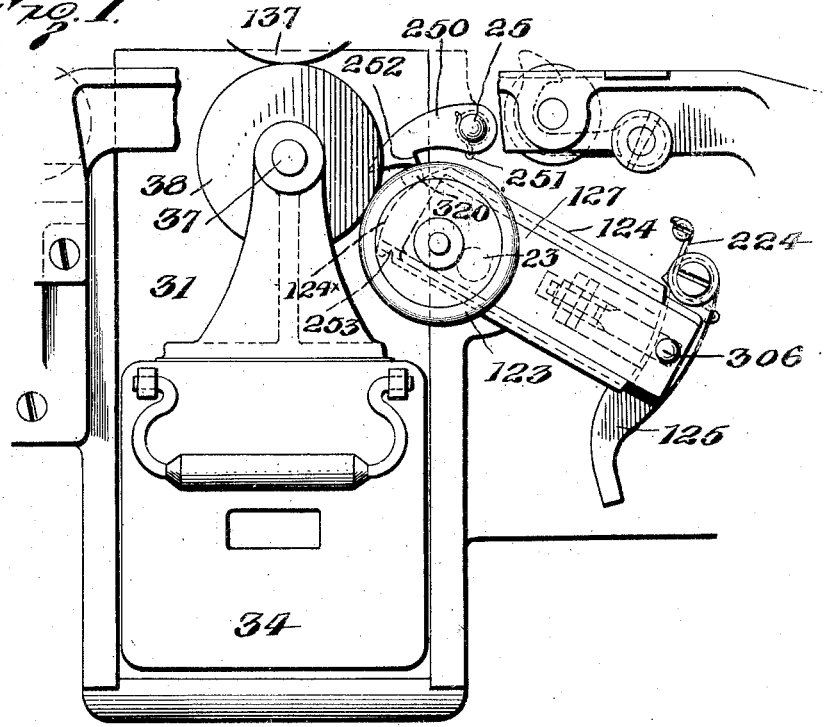
Figure 1 is a plan view of part of a mail marking and inking machine such as shown in application No. 368,701 aforesaid, showing the meter in place in the machine and the inker in operative position.

In the machines shown in the aforesaid patent and applications the letters are directed to and between an impression roller 137 and printer 38, hereinafter referred to, and after being postmark-stamped the letters are stacked on a table or rack.

The said machine is provided with a meter for registering the operations of the printer, which meter as shown in said applications comprises a base 31, a printer 38, and a casing 34 fastened to this base inclosing the registering mechanism and locking devices therefor; as shown and explained in the aforesaid applications, the whole being so constructed that they are removable from and replaceable in the machine as a unit.

The printing member or "printer" 38, may be of any suitable kind (but preferably as described in said applications) and is mounted on a spindle 37, journaled in bearings on the meter and having a key 47$^a$ on its lower end as described in said application #368,701. For the purpose of postmark-stamping letters the printer should be provided with suitable dies for printing the stamp upon the letter. It is preferred to use a postmark-stamp die such as shown in the patents and applications above referred to, or in patents No. 753,207; No. 1,274,831 and No. 1,273,793.

The top plate of the machine is provided with a horizontally disposed slot into which the base 31 of the meter is slid when placing the meter in operative position, as indicated in Fig. 1; the slot having grooves in its sides adapted to be engaged by the ribs on the sides of the base 31 of the meter; and when in operative position on the machine the meter is secured by a catch 150, or other suitable means, as described in said application #368,701.

When the meter is slid into place in the machine the key 47ª on the lower end of the spindle 37 is adapted to telescope with and enter the slot 20ª in the upper end of a driven member 20 (Fig. 7) whereby the spindle and printer will be rotated, as explained in the aforesaid applications, when the parts are in operative position and the trip mechanism is actuated by the passage of a letter.

The printer 38 may be supplied with ink by any suitable means. I prefer to employ an inking pad or roller 123 (Fig. 1) which is mounted on a swingable support or arm 124 connected to the upper end of a shaft 23, suitably mounted in the frame at one side of the meter; so that the inking roller 123 can be turned from the position shown in full lines in Fig. 1, where it contacts with the printer 38, into the position shown in Fig. 2 where it will not contact with the printer. The inker may be held in operative position to contact with the printer 38 by means of a catch 125 having a tooth adapted to engage the end of the support 124 as indicated in Figs. 1 and 3, this latch being controlled by a suitable spring 224.

The inking roller 123 is preferably adjustably connected to the support 124 by mounting the inking roller on a slide 127. When the inking roller 123 is turned out of operative position, as indicated in Fig. 2, it may be adjusted into contact with a gage pin 25, which is so fixed in the machine that if the periphery of the inking roller is set up against this gage pin when the support 124 is in the position indicated in Fig. 2, then the periphery of the inking roller 123 will properly contact with the printing surfaces on the printer 38 and properly supply ink thereto when the inking mechanism is turned to operative position, as shown in Fig. 1, and explained in application Serial No. 385,681.

It is practically essential that the "meter" be in exact operative position in the machine and absolutely "home" in the proper position with respect to the connection or mated slot (Fig. 7) between the meter and the driving mechanism before the machine is operated. To hold the meter in such proper position a latch 150 engages a detent notch in the meter base as shown in Fig. 6 in aforesaid application Serial No. 368,701.

Figure 2:
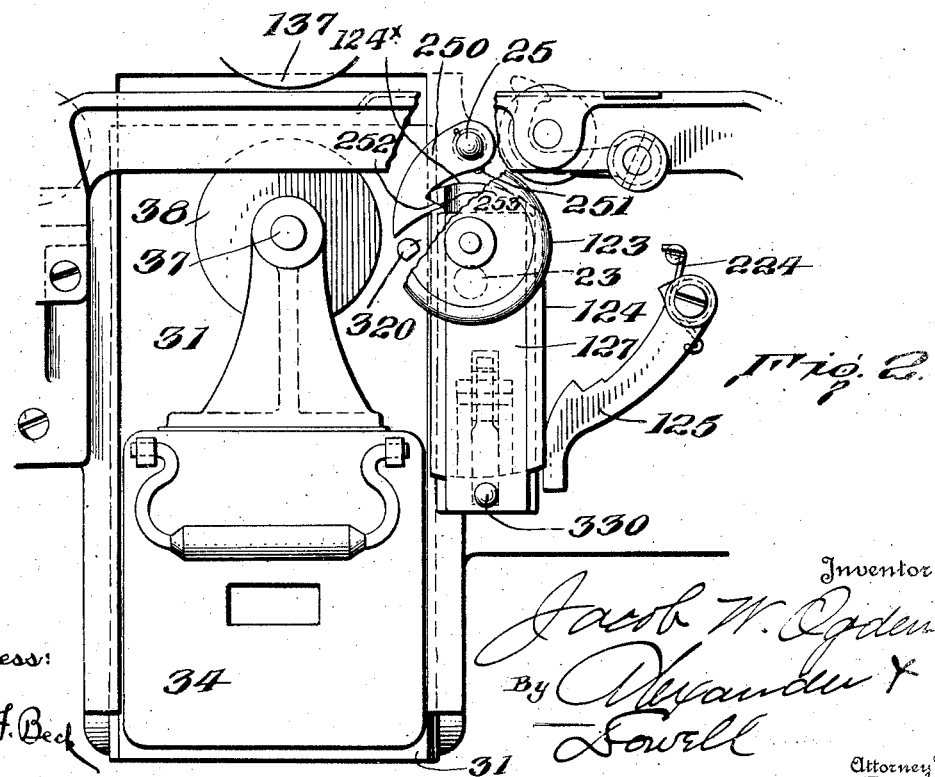
Fig. 2 is a similar view showing the meter partly withdrawn and the inker locked in inoperative position.

I provide an additional safeguard that will not only insure the proper positioning of the meter, but also disengage the trip mechanism, thereby precluding the possibility of the driving mechanism causing the two mated parts 20ª and 47ª (Fig. 7) to become jammed, or possibly cause breakage, a pin 320 is secured to the meter base 31 in the position indicated in Figs. 1 and 2. This pin 320 will prevent the ink roller support 124 from being turned into position to bring the inking roller into contact with the printer 38 unless and until the meter has been pushed all the way "home", thus precluding the possibility of any effective action of the printer until the meter is in the proper printing position and the catch 150 is engaged with the meter base as indicated in Fig. 6, and the inker is in effective contact with the printer, as indicated in Fig. 1.

The pin 320 renders it necessary to readjust the inker to operative position each time the meter is replaced in the machine; and this pin insures that the printer can not be effectively operated until the inker is in operative position. This pin 320 also serves to prevent the meter after being properly positioned in the machine (Fig. 1) from being removed therefrom until the inker has been moved out of contact with the printer into the position shown in Fig. 2. It will be seen by referring to Fig. 1 that when the inker is in position to ink the printer the end of the inking roller support 124 projects into the path of the pin 320 and closely adjacent same, so that if it was attempted to remove the meter the pin 320 would engage the end of the support 124 and prevent such removal of the meter. Therefore the meter cannot be withdrawn until the inking roller support 124 has been turned to the position indicated in Fig. 2 out of contact with the printer 38 and out of the path of the pin 320. The inner end of the support 124 is preferably rounded, as indicated at 124ˣ, to permit the end of said support to swing past the pin 320 in adjusting the inker to or from the printer.

The pin 320 thus prevents the removal of the meter from, or replacing it in, the machine without first moving the inker out of operative position; thus rendering it necessary for the operator to readjust the inker each time the meter is replaced in the machine.

Suitable means should be provided to prevent the inker being returned to operative position when the meter is out of the machine. In the construction shown a catch 250 is pivoted on the gage pin 25 and is urged toward the inking roller by spring 251. Catch 250 has a tooth 252 on its inner end which is adapted to engage a notch 253 in the side of the support 124 of the inking roller, when the meter is removed or partly removed from the machine, as shown in Fig.

2, and when so engaged it will be impossible to swing the inker back into operative position even though the meter be removed.

To remove the meter from the machine, it is necessary to first swing the inker out of contact with the printer and around to contact with the gage pin 25, see Fig. 2, in order to clear the way for the outward movement of pin 320 with the meter. As the meter is withdrawn the pin 320 moves with it, releasing catch 250 which thereupon engages notch 253 in the inker support 124, see Fig. 2, and prevents the inker from being swung into printing position, while the meter is out of place or removed from the machine.

As the meter is replaced in the machine pin 320 pushes catch 250 out of engagement with notch 253, in support 124, and then insures a proper positioning of the meter in the machine before the inker can be moved into contact with the printer, as the pin 320 will not clear the end of support 124 until the meter is in exact position in the machine.

In the inking mechanism shown in the applications above referred to the slide 127 carrying the ink roller on the support 124 was adjustably secured to the support 124 by a thumb screw and it was possible to carelessly back up the inking roller, or for it to back out of contact with the printer while in printing position, (Fig. 1) and thus fail to properly ink the printer.

I provide suitable means to prevent the inker from backing out of contact with the die and also to prevent the roller being purposely backed away from die while the inking devices are in printing position.

In the construction shown (Figs. 3–5) the inker 123 is mounted on a sliding plate 127 which has a ratchet toothed rack 224 on its under side, which rack is engaged by a multiple-toothed pawl 300 which has a pair of depending lugs 330 pivoted to support 124 by a pin 301; this pawl is normally pressed against the rack by a spring 302.

A lever 304 is also pivoted on pin 301 and passes between the lugs 330 of the pawl 300. The inner arm of this lever engages the under side of the pawl and the outer arm of the lever is yieldingly depressed by a spring 305. This lever 304 exerts additional pressure against the pawl 300 by adding the pressure of the heavier spring 305 to the pressure of the lighter spring 302, thus preventing accidental shifting of the position of the slide 127 and roller 123 when being shifted from the position shown in Fig. 2 (against the gage pin 25) to the position shown in Fig. 1 (in contact with the printer 38).

When it is desired to remove the roller 123 and its holding plate 127 from the machine the pawl 300 can be entirely disengaged from the rack by pressing the heel 334 of lever 304 against the outer end 331 of the pawl 300 (see Fig. 4).

When the roller is against the printer (see Fig. 1) the plate 127 and roller 123 will be locked in adjusted position on the support 124, as the outer end of the lever 304 is then engaged under the catch 125 (see Figs. 3, 4 and 5), thereby positively locking the pawl 300 in mesh with the rack 224 on bottom of plate 127. A knurled handle 306 may be attached to plate 127 to facilitate manual adjustment of plate 127 and inking roller.

It will be seen from the foregoing that the meter carrying the printer must be accurately positioned in the machine before the printer can be inked and effectively operated; this is insured by the pin 320 as above described. Also that the meter cannot be removed from or replaced in the machine unless the inker is moved out of operative position. This is accomplished by the pin 320 and the related end of the inker support 124; also that the inker is held in inoperative position when the meter is out of position or removed from the machine; this is done by the catch 250, as above explained; also that the inking roller is adjustably but securely positioned on its support by the rack 224 and dog 300; and that it is positively locked when adjusted in inking position by the action of the catch 125 engaging the lever 304, as above described; also that the inker is automatically released when the meter is properly inserted in the machine by the pin 320 disengaging the catch 250 from the inker support.

While the means shown and described are at present preferred for accomplishing the desired ends, the invention is not limited to the specific construction shown, and what I claim is:

1. In a machine of the character specified, a removable printer; an inker; an adjustable support for said inker whereby it may be moved into position to contact with the printer or out of position to contact therewith; disconnectible means to hold the inker out of operative position; and means whereby the inker can not be moved into position to contact the printer until the printer is properly positioned in the machine; and means whereby removal of the printer from operative position is prevented until the inker is moved out of operative position.

2. In mechanism as set forth in claim 1; a catch adapted to engage the inker support and hold the inker out of operative position when the printer is removed from the machine, said catch being automatically disengaged when the printer is inserted in the machine.

3. In a machine of the character specified; a meter carrying a printer; an inker for the printer; an adjustable support for said inker being movable into position to contact with the printer when the meter is inserted in the machine or out of position to contact therewith; and means whereby the inker can not be moved into position to contact with the printer until the meter is accurately positioned in the machine.

4. In a machine as set forth in claim 3; means whereby removal of the meter from opertaive position is prevented until the inker is moved out of operative position.

5. In mechanism as set forth in claim 3; a catch adapted to engage the inker support and hold the inker out of opertaive position when the meter is removed from the machine, said catch being automatically disengaged when the meter is inserted in the machine.

6. In a machine of the character specified, a printer; an adjustable inking means; a removable meter, and a device connected with the meter whereby the removal of the meter is prevented by contact of said device with said inking means unless the inking means is first moved into inoperative position; and means adapted to engage the inking means and hold the latter in inoperative position when the meter is removed from the machine.

7. In combination with mechanism as set forth in claim 6; means for automatically releasing the inking means when the meter is properly positioned in the machine.

8. In a machine of the character specified, a printer; an adjustable inking means; a removable meter, and a device connected with the meter whereby the removal of the meter is prevented by contact of said device with said inking means unless the latter is first moved into inoperative position; and a catch adapted to engage the inking means and hold the latter in inoperative position when the meter is removed from the machine, said catch being disengaged by the device connected with the meter when the meter is replaced in the machine.

9. In a machine of the character specified, a printer, an inker, an adjustable support for said inker whereby it may be moved into or out of operative position, a removable meter, and a pin connected with the meter base whereby the removal from or insertion of the meter in the machine is prevented by contact of said pin with the inker unless the latter is first moved into inoperative position; and means adapted to hold the inker in inoperative position when the meter is removed from the machine.

10. In mechanism as set forth in claim 9; means whereby the inker is released when the meter is properly positioned in the machine.

11. In a machine of the character specified, a printer, an inker, an adjustable support for said inker whereby it may be moved into or out of operative position, a removable meter, and a pin connected with the meter base whereby the removal from or insertion of the meter in the machine is prevented by contact of said pin with the inker unless the latter is first moved into inoperative position; and a catch adapted to engage the inker support and hold the latter in inoperative position when the meter is removed from the machine, said catch being disengaged by the pin on the meter base when the meter is replaced in the machine.

12. In a machine of the character specified, a printer; an inker; an adjustable support for said inker whereby it may be moved into position to contact with the printer or out of position to contact therewith; means for setting the inker when out of operative position so that it will properly ink the printer when moved into inking position; and means adapted to hold the inker in inoperative position when the meter is removed from the machine; said means being automatically disengaged when the meter is replaced in the machine.

13. In a machine of the character specified, a printer; an inker; an adjustable support for said inker whereby it may be moved into position to contact with the printer or out of position to contact therewith; a pin for setting the inker when out of opertaive position so that it will properly ink the printer when moved into inking position; and a catch pivoted on said pin adapted to engage the inker support and hold the latter in inoperative position when the meter is removed from the machine, substantially as described.

14. In a machine of the character specified, a printer, an inker, an adjustable support for said inker whereby it may be moved into or out of operative position; a removable meter; and a pin connected with the meter base whereby the removal from or insertion of the meter in the machine is prevented by contact of said pin with the inker unless the latter is first moved into inoperative position; with a relatively fixed pin against which the inker may be set when out of position to engage the printer, so that when so set it will properly ink the printer when moved into inking position; and a catch pivoted on said pin adapted to engage the inker support and hold the latter in inoperative position when the meter is removed from the machine, substantially as described.

15. In a machine of the character specified; an inker, an adjustable pivoted support therefor whereby the inker may be moved into or out of operative position; a catch adapted to engage one end of the support and retain the support with the inker in operative position; and a catch adapted to engage the other end of the support to hold the inker in inoperative position.

16. In a machine of the character specified; an inker roll; an adjustable support therefor whereby the inker may be moved into or out of operative position; means for holding the support with the inker in operative position; and means adapted to engage the support to hold the inker in inoperative position; with a removable printer adapted to be inserted beside the inker; a device connected with the printer adapted to engage the inker support and prevent removal of the printer when the inker is in operative position, and to release the device for holding the inker in inoperative position when the printer is adjusted to proper position in the machine.

17. In a machine of the character specified; an ink roll; an adjustable support therefor whereby the inker may be moved into or out of operative position; means for holding the support to hold the inker out of operative position; and means adapted to engage the end of the support to hold the inker in operative position; with a removable meter carrying a printer adapted to be inserted beside the inker; a device connected with the meter adapted to engage the inker support and prevent removal of the meter when the inker is in operative position, and to release the device for holding the inker in inoperative position when the meter is adjusted to proper position in the machine.

18. In combination, an inker; a slide carrying the inker; a pawl engaging the slide; and means for locking the pawl when the inker is adjusted to operative position.

19. In combination, an inker; a movable support for the inker; a plate carrying the inker slidably mounted on the support; a pawl engaging the plate to lock it to the support; and means for locking the pawl when the inker is adjusted to operative position.

20. In combination, an inker; a slide carrying the inker; a pawl engaging the slide to lock it; and means for locking the pawl when the inker is adjusted to operative position; with means for holding the inker in operative position; and means for locking the pawl when the inker is in operative position.

21. In combination, an inker; a pivoted support for the inker; a plate carrying the inker slidably mounted on the support; a pawl engaging the plate to lock it to the support; with a catch for locking the support to hold the inker in operative position; and means engaged by said catch for locking the pawl when the inker is in operative position.

22. In mechanism of the character specified; a support, a plate slidably mounted on said support; an inker carried by said plate; a pawl pivoted on the support and engaging the said plate; and a lever pivoted on the support adapted to operate the pawl, substantially as described.

23. In combination with mechanism as set forth in claim 22; a latch for locking the support when the inker is in operative position, said latch also locking the pawl holding lever when locking the inker in operative position.

24. In mechanism of the character specified; an adjustable pivoted support, a plate slidably mounted on said support and provided with a ratchet; an inker carried on said plate; a pawl pivoted on the support and engaging the ratchet on said plate; and a lever pivoted on the support and adapted to operate the pawl; and a spring pressing said lever, substantially as described.

25. In combination with mechanism as specified in claim 24; a latch for locking the support when the inker is in operative position, said latch also locking the pawl holding lever when the inker is locked in operative position.

In testimony that I claim the foregoing as my own, I affix my signature.

JACOB W. OGDEN.